Oct. 11, 1938.  C. A. VERSCHOOR  2,133,218
PHOTOGRAPHIC ENLARGER
Filed Feb. 6, 1937   2 Sheets-Sheet 1
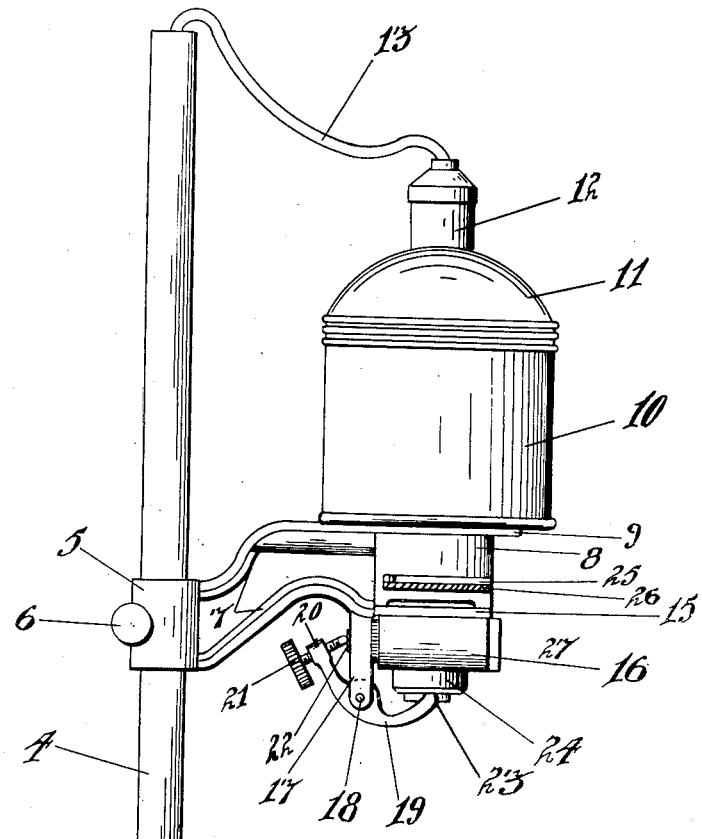
Fig.1.
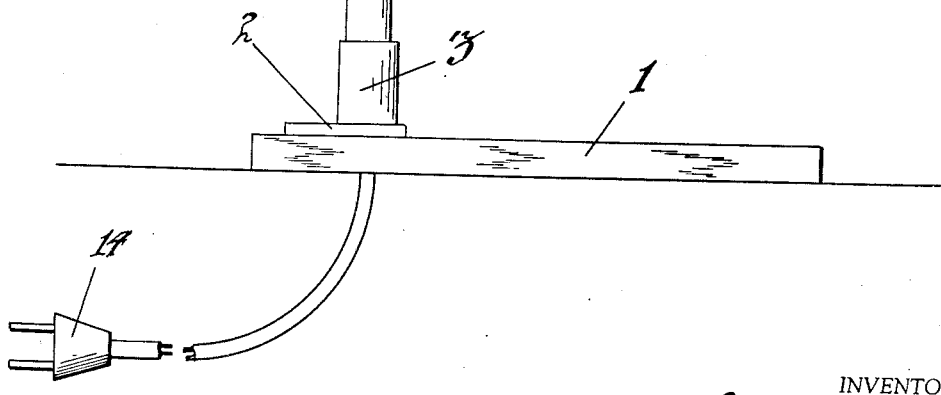
INVENTOR.
CHARLES ALBERT VERSCHOOR.
BY Philip S. Hopkins.
ATTORNEY.

Oct. 11, 1938.   C. A. VERSCHOOR   2,133,218
PHOTOGRAPHIC ENLARGER
Filed Feb. 6, 1937   2 Sheets-Sheet 2
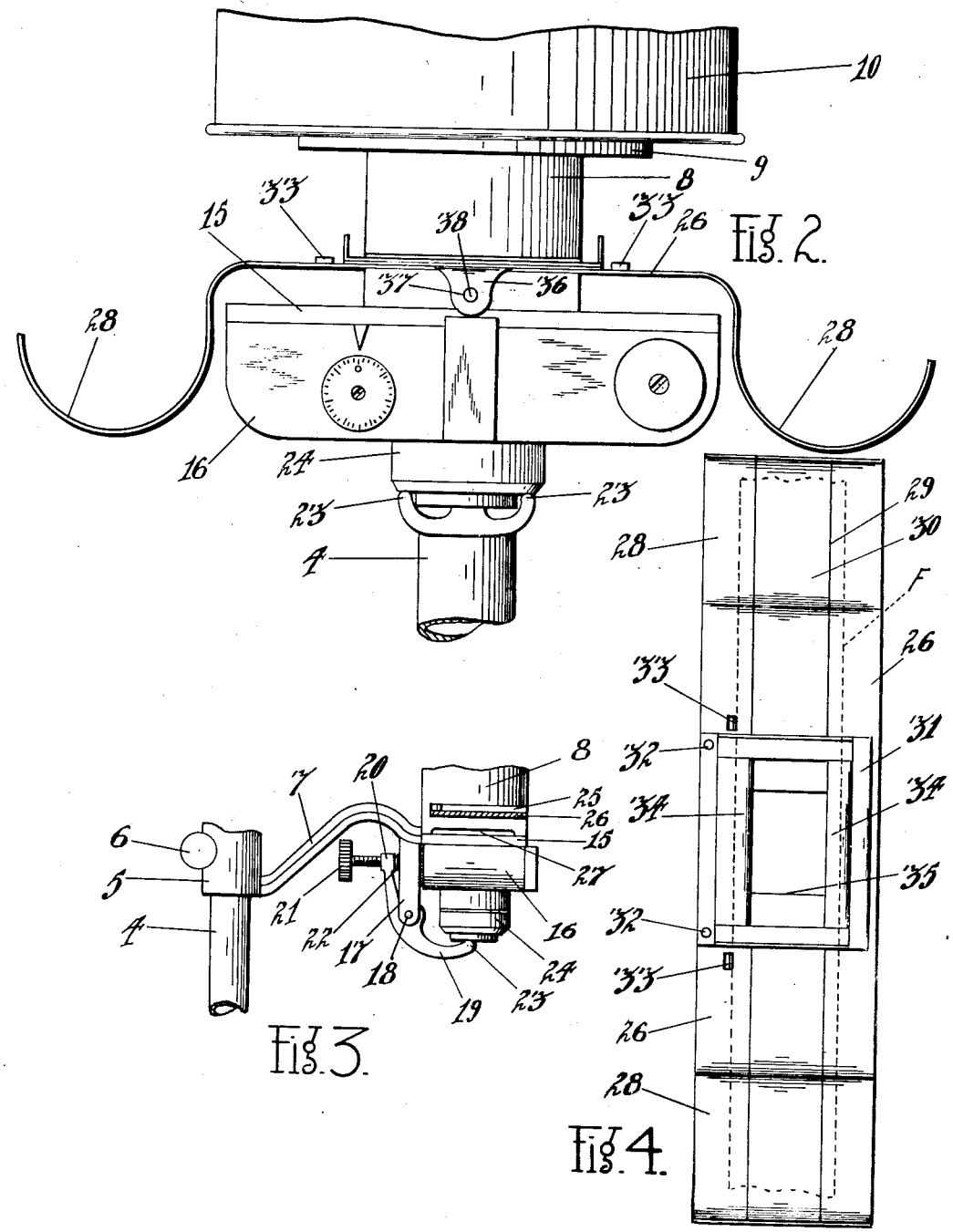
INVENTOR.
CHARLES ALBERT VERSCHOOR,
BY Philip S. Hopkins
ATTORNEY.

Patented Oct. 11, 1938

2,133,218

UNITED STATES PATENT OFFICE 2,133,218

PHOTOGRAPHIC ENLARGER

Charles Albert Verschoor, Ann Arbor, Mich., assignor to International Radio Corporation, Ann Arbor, Mich.

Application February 6, 1937, Serial No. 124,366

2 Claims. (Cl. 88—24)

My invention relates to a photographic enlarger and has for its principal object the provision of an enlarging device or projection printer in which a photographic camera and its regular taking lens is utilized as the image projecting means of the enlarger.

An important object of my invention lies in the provision of an adjustable supporting means for a lamp house and camera whereby enlargements of different sizes can be made.

Another object of my invention lies in the provision of novel holding means for the camera on the support and for focusing the lens of the camera in any adjusted position.

Still another object lies in the provision of a novel film holding means removably mounted upon the support whereby a strip of negative images may be disposed for selective projection and the film strip readily adjusted in the apparatus without removing the film holder therefrom.

My invention pertains particularly to the use of the now popular miniature cameras and films utilizing a strip of narrow width negative film and upon which a large number of images are taken and from which enlargements are made of selected images.

My apparatus has been designed largely for simplicity and economy, with few operating parts and which utilizes the camera itself, with which the negative images have been made, as the projecting element of the enlarger.

Other objects and advantages will be apparent as the description proceeds, reference now being had to the figures of the accompanying drawings forming a part of this application and wherein like reference numerals indicate like parts.

In the drawings:

Figure 1 is a side view of my enlarger in operative position.

Figure 2 is a detail front view of the camera supporting means and showing the film holder in operative position.

Figure 3 is a detail side view of the camera supporting and lens focusing device.

Figure 4 is a top plan view of the film holder removed from the apparatus.

The reference character 1 refers to a supporting base and upon which is adapted to be placed the sensitized paper or film to receive the projected image.

Securely mounted upon the base 1 as by the plate 2, is a socket 3 adapted to securely receive and hold an upright supporting rod 4, slidably supported upon which is a sleeve 5 adapted to be vertically adjusted to any desired position and secured in any adjusted position by means of the lock nut 6.

Rigid with the sleeve 5 are projecting supporting arms 7 connected at their outer ends by a supporting member 8, flanged at its upper end as at 9 to receive and support a lamp housing 10 which may be fastened to the flange 9 by screws or other suitable means. The lamp housing 10 has a threaded removable cover 11, preferably dome-shaped, to receive and serve as a reflector for a lamp to be disposed therein, a lamp socket 12 being provided on the upper side of the cover 11 and the conductor wire 13 therefrom adapted to extend through the rod or tube 4, made hollow for that purpose, and being provided at its lower projecting end with a plug 14 for engagement with any standard current supply source.

The supporting member 8 is hollow to permit the light from the lamp housing 10 to pass downwardly therethrough.

The underside of the support 8 has secured thereto by screws or other suitable means, a flanged plate 15 provided with a central opening therethrough in alignment with the hollow support 8. This plate 15 is the same size as the ordinary removable back of the camera 16 which is utilized as the projecting unit in this apparatus.

The lower supporting arm 7 is provided adjacent the supporting member 8 with a downwardly depending bracket 17 to the lower end of which is pivoted, as at 18, a substantially arcuately shaped lever 19. The upper rear end of this lever is provided with an enlargement 20 which is threaded to receive a threaded adjusting screw 21, the inner end of which is adapted to engage against a pad 22 formed on the bracket 17 whereby to adjust the angular position of the lever 19 about the pivot 18.

The opposite end of the lever 19 is bifurcated to form the supporting fingers 23.

The camera 16 is provided with a lens mount 24 which is slidable in the camera against spring tension and is normally urged outwardly, in a manner clearly illustrated and described in applicant's patent, No. 2,052,261, dated August 25, 1936.

In utilizing the camera 16 in this apparatus, the regular cover or back of the camera is removed and the camera is placed beneath the flanged plate 15, which takes the place of the regular back but permits the light to pass through the camera from the lamp housing 10. The lens barrel or mount 24 is released so that the spring normally urges the same outwardly and is disposed directly over the fingers 23 of the supporting lever 19, such fingers engaging on either side of the lens mount and not interfering in any way with the passage of the light through the camera and lens. The lever 19 is, of course, adjusted to permit the ready insertion of the camera into the position shown in Figures 1 and 2 and then the adjusting screw 21 is manipulated to bring the fingers 23 of the supporting lever 19 into camera supporting engagement against the tension of the spring of the lens mount. Thus the camera is securely held in position against the resilience of the lens mount spring, but may be easily removed by adjusting the screw 21 to permit the camera to be lowered away from the plate 15.

In its mounted position, the camera and lens 24 may be focused upon the supporting board 1 by means of the adjusting screw 21 moving the lens further inwardly against the tension of the spring or permitting it to move outwardly under the influence thereof.

The support 8 is provided with a slot 25 open at the front edge to receive the body of a film holder 26. The support 8 is also recessed on its underside directly above the plate 15, as at 27, to receive a filter or mask as may be desirable.

The film holder 26 is an elongated metal plate bent at its ends as at 28 to provide curved film receiving portions. This holder is indented as at 29 throughout its length and centrally between the side edges to provide a recessed portion 30 of a width substantially equivalent to the width of the picture areas of the film (shown in dotted lines at F) whereby in moving the film longitudinally through the holder the picture areas are not subjected to rubbing or scratching. The edges of the film engage upon the holder 26 at opposite sides of the depression 30.

Centrally of the straight body portion of the holder there is provided a flexible frame 31 secured as at 32 to one side of the holder, the opposite edge of the frame being free to be raised to permit the insertion of the film thereunder. At either side of the frame and disposed at one side of the holder are upturned lugs 33 serving as guides for the edge of the film.

The frame 31 is provided with film engaging portions 34 extending longitudinally of the frame and adapted to engage the edges of the film only on each side of the central picture portion thereof.

The holder 26 is provided centrally and in alignment with the frame with an opening 35 over which a film image is adapted to lie and through which it is to be projected by the light from the lamp housing 10.

The front edge of the holder 26 is provided with a downturned ear 36 having an opening 37 adapted to fit over a pin 38 on the support 8 directly beneath the slot 25. This is for the purpose of centering the holder on the support 8.

When the holder is provided with a film disposed beneath the frame 31, it is slid into the slot 25 until its rear side engages the back end of such slot and with the opening 37 engaged over the pin 38. As the holder is slid into position in the slot 25, the supporting member 8 directly overlying the slot depresses the resilient frame 31 downwardly to bring the strips 34 into frictional engagement with the edges of the film. Such strips are rounded and smooth to prevent any but a firm frictional pressure on the film.

The film may be slid back and forth in the holder to bring any desired frame into position for projection. The ends of the film naturally curl up within the holder portions 28.

In operation and with the camera 16 in position on the enlarger and a film in the holder in proper position for projection, the supporting sleeve 5 may be raised or lowered to provide the desired size of enlargement of the negative image on the film. When the size has been adjusted, the sleeve and entire supporting structure is locked on the rod 4. The adjusting screw 21 is then adjusted to properly focus the image on the platen 1. Sensitized paper or film may then be placed upon the platen 1 in aligned position and the light in the lamp housing 10 illuminated for the desired length of time for making the exposure.

Of course, changes may be made in details of construction and arrangement of parts without departing from the spirit and scope of my invention. I do not limit myself, therefore, to the exact form herein shown and described other than by the appended claims.

I claim:

1. An enlarging apparatus comprising a supporting stand, a lamp housing and holder adjustable thereon, means for removably securing a photographic camera to said holder with the lens thereof in position for image projection, and means for adjusting the focus of said lens, said means comprising a pivoted arm having means engaging the lens mount, said arm having an adjusting screw at one end engageable with a fixed part of said holder and separated fingers at its opposite end engaging on each side of said lens, said lens being resiliently mounted in said camera and normally urged outwardly against said fingers.

2. In a device of the character described, in combination, a supporting stand, a lamp housing and holder adjustable thereon, means for removably securing a photographic camera to said holder with the lens thereof in position for image projection, means supporting a film having images thereon for said projection, said means comprising a removable trough, guiding means for said film carried by said trough, indented portions at each end of said trough to accommodate the rolled ends of said film in position for image projection, means for centering said trough with respect to said camera, said means comprising a pin and aperture connection between said holder and said trough and means to adjust the focus of said lens.

CHARLES ALBERT VERSCHOOR.